United States Patent Office 2,734,821
Patented Feb. 14, 1956

2,734,821

RECOVERY OF ELEMENTAL METAL POWDER FROM SALT SOLUTIONS

Felix A. Schaufelberger, Yonkers, N. Y., assignor to Chemical Construction Corporation, New York, N. Y., a corporation of Delaware No Drawing. Application March 14, 1952, Serial No. 276,710

14 Claims. (Cl. 75—108)

This invention relates to the production of powdered metals. More particularly, it is concerned with the production of metals in powder form by direct gas reduction. Still more specifically, the invention deals with direct gas reduction of metal salts, dissolved in acidic, neutral and basic solutions, to obtain product metal in good yields and in commercially acceptable purity.

In general, the present invention is concerned with the production and/or refining of such widely varied metals as cadmium, cobalt, copper, mercury, nickel, silver and some of the rarer metals between silver and cadmium in the electromotive force series and capable of forming with ammonia a complex ion. Of these, problems dealing with copper, nickel and cobalt are, at the present time, those most commonly encountered. Since these problems are general and the solutions of the problems applicable throughout the field, production of metal from solutions containing these cations will be discussed as illustrative.

According to the present invention, a general statement of the process is simple. A clarified solution containing a dissolved salt of the desired metal is adjusted to optimum hydrogen ion and dissolved material contents and subjected to increased temperatures, usually above the boiling point, under a partial pressure of, and in the presence of, suitable reducing gas, preferably the solution being thoroughly agitated during the process. Reducing conditions are maintained until reaction is sufficiently complete. Precipitated product is collected, washed, dried and used or shipped. Residual solutions and/or washings are variously recovered and recycled.

However, the simplicity of the process as so stated is more apparent than factual. In the past, there have been many attempts made to treat similar solutions under superficially similar conditions, allegedly to obtain similar products. However, in view of the great and growing demand for such a process, the complete failure of these proposals to accomplish the desired results is evidenced by their failure to win commercial acceptance. These proposals failed, either in purity of product, or yield of potential product, or for various reasons based on economic considerations and could not be developed on a competitive basis.

It is, therefore, the principal object of the present invention to devise a suitable, hydrometallurgical process which is not hampered by the various drawbacks of the processes previously known. Such a process should produce the products as metals, in high yield, in high purity, at reasonable cost, without the necessity for the use of unusual or expensive apparatus and making use of simple and readily available reagent materials.

Surprisingly, in view of the previous failures, these objects have been fulfilled in a highly satisfactory manner. This has been accomplished by a combination of two factors. First, a strict control is made of the composition of the adjusted solution, i. e., its dissolved metal concentration, its content of free hydrogen or hydroxyl ions, ions or salts capable of forming a soluble complex of the metal, and extraneous dissolved materials; the reduction temperature; the partial pressure of reducing gas; the reaction time; the proper use of agitation and proper reducing-gas usage. Secondly, solution composition is controlled on a new basis, heretofore unrecognized. It is control of solution composition at the final, not necessarily the initial, stages of the reduction period that is critical in obtaining the desired optimum results. Finally, control is adapted to produce the product metal in the desired physical state.

Attempts to follow the allegations in the teachings of the previous proposals always ended with one or more of the following unsatisfactory results. In many cases, no elemental metal powder is obtained at all. Rather, an oxide, hydroxide, carbonate or sulfide is obtained. In some cases a little metal may be initially precipitated, after which reaction ceases or is accompanied by precipitation of a compound of the metal.

Of primary importance in the present process, it has been found that these failures are principally due to the lack of recognition of the importance of preventing certain terminal conditions until metal precipitation has reached the satisfactory stage. In the present process, the operating conditions are initially adjusted, and, if necessary, subsequently adjusted, to prevent these conditions being prematurely obtained.

Also according to the present invention, it has been found that the conditions at the completion of reduction have definite optimum limitations. Within certain limits, the individual conditions may be varied considerably. However, for each of the conditions which must be controlled, the limitations must be observed for each. The ranges of optimum conditions may vary in some cases for different metals in different solutions. Accordingly, they will be more fully discussed for such cases.

Before doing so, however, certain generalizations may and should be noted. Primarily, perhaps, it should be noted that the original source of the solution of metal values is irrelevant. It may be from any or all of (1) sulfides ores or concentrates which have been leached by various known methods, including such ancillary steps as roasting and/or blending; (2) oxidized ores, metal-bearing precipitate, a crude metal, dross, speiss or slag which has been leached; or (3) spent plating solutions pickling solutions or other waste or by-product solutions, resulting from some other and non-material operation.

In the present discussion, for purposes of simplification, the abbreviations "p. s. i." will be used to indicate pounds pressure per square inch gauge; g./l. for grams per liter and M/l. for mols per liter. Also, the terms "free acid" and "free ammonia" are frequently used. Solutions of the metal sulfates and of ammonium sulfate have an acid reaction with a pH ranging from about 2.0 to 4.5. Such solutions, however, are considered to have no "free acid" or "free ammonia" content. When the amount of sulfate, or other anion present, exceeds that needed to combine with the metal and ammonium cations, the solution is considered to have "free acid."

When ammonia is added to such solutions, ammonium salt is formed with the free acid. On further addition of ammonia, some will remain dissolved in the solution, per se or as ammonium hydroxide; some will combine with the metal to form a metal-ammonia complex ion or metal "ammine." The "free ammonia" present is considered to include each of these latter forms, but not that which forms ammonium salt. The expression "total ammonia" designates the sum of the "free ammonia" and the ammonia present as ammonium salts.

The amount of "free acid" or "free ammonia" present is determined by titration to the natural pH of the sulfate or other salt in the solution. It is, therefore, possible not only to have salt solutions having an inherent acidic pH without having any "free acid," but even to have such solutions whose pH is less than 7 but contain an appreciable amount of free ammonia. Also, it should be noted that when the amount of ammonium, sulfate or other ion is expressed, both the associated and dissociated forms are included. Hydrogen ions are an exception and only the dissociated form is included.

Further, it will be assumed for the purposes of this discussion, that the solution to be treated contains only one metal, gas-reducible under the operating conditions. This is a warrantable assumption, since various methods of selective precipitation or dissolution, fractional crystallization and the like are known by which substantially pure solutions of salts of a single metal can be obtained. How this solution is obtained, therefore, is not a feature of the present application. The solutions to be treated will be assumed to be of useful metal concentration. This will depend, to some extent, on the value of the metal itself. For metals of a high unit value, such as cobalt or silver, solutions of low concentration, as low as 10 g./l. or less may be usefully worked. On the other hand, for a metal such as copper, solutions containing 20 g./l. or more are desirable.

It should be noted also that the solutions to be treated will ordinarily be aqueous in origin and nature. However, in selective separations of various metals and salts by know methods, other solvents, such as alkanols, ethers, ketones, esters, and the like, have been used. Any solvent which will dissolve the metal compound in reasonable concentrations and will withstand the other operating conditions may be used in the present process, if so desired. In some cases the reducing gas may be more soluble than in water, hydrogen being more soluble in methanol, for example. However, aqueous solutions will be those most commonly encountered and will be taken as illustrative.

As noted above, the present invention deals with those metals whose oxidation-reduction potentials lie between those of cadmium and silver, inclusive, and which have the ability to form a gas-reducible complex ion. The latter may be in form of a cation complex ammine of the $[Me_x(Am)_y]$ type in which Me is the metal and Am is a complex-forming amine. These will be found in solutions ranging from somewhat acid to strongly basic conditions. On the other hand, anion complexes of the $(Ac_xMe_y)$-type in which Ac represents an acid radical may be found in solutions ranging from somewhat basic to strongly acidic.

Ammonia will be generally discussed as the complex-forming amine, and complexes of it with cobalt, nickel or copper taken as illustrative of the "ammines" with which the invention is primarily concerned. Ammonia is the most economical of the available amines and in practice, will be that most commonly encountered. However, similar, or even better, results are obtainable, though usually at increased cost, using various organic amines such as methyl amine, ethylene diamine and the like in place of part or all of the ammonia.

The anion may be varied considerably, depending somewhat upon whether the solution is acidic or basic. In ammoniacal solution, there may be present other anions except those which form an undissociated complex with the metal or react with the reducing gas. In acidic solutions, fluosilicate, acetate or other anions which give adequate metal solubility may be used if they do not react with the reducing gas. Again, strong monobasic acids such as nitric and hydrochloric are not commercially useful, although they can be made operable from ammoniacal solutions.

As a practical matter, for economic reasons, those anions which will be commercially encountered will be rather limited. In basic solutions, they will be the sulfate or carbonate ions. In acidic solutions, sulfate, fluosilicate, or acetate ions may be encountered. These will, therefore, be taken as illustrative for the purposes of this discussion.

Broadly speaking, there are many gases which can be used to reduce solutions of metal salts. However, in the practice of the present invention, it has been found that gases containing sulfur, for example, $H_2S$ and $SO_2$, generally result in the production of products containing sulfur. Accordingly, it is highly desirable, if not absolutely necessary, to avoid the use of reducing gases containing elements which react with the metal of interest to form undesirable compounds, for example, sulfur, which tends to form sulfides.

Perhaps the most convenient reducing gas, suitable for the purpose, is hydrogen. It is readily produced by a number of different and commercially developed processes. Its use can result in no contamination of the metal product.

Carbon monoxide may also be used. It is somewhat more powerful than hydrogen, and reductions can usually be accomplished at a lower temperature. Carbon monoxide is particularly useful in the reduction of copper-ammonium carbonate solutions where it also tends to produce a powder which is coarser and usually more dense. However, for the reduction of other solutions, the product powders obtained with hydrogen are quite suitable. In using carbon monoxide as the reducing agent, it is converted to carbon dioxide.

In the reduction of acid solutions, liberation of carbon dioxide increases the pressure needed for optimum reduction and may limit the amount of reduction which can be accomplished in any single operation. Further, with some metals, for example, nickel, carbon monoxide forms carbonyl compounds, especially in basic solutions and for these solutions, the difficulty of handling the carbonyl makes the use of carbon monoxide undesirable.

Many organic compounds, usually gaseous, or liberating gas at reduction temperatures, technically will reduce metals from solutions. Among these are formaldehyde, formic acid, hydrazine and the like. Many are economically impractical. Many will not reduce to elemental metal. Some are just not operationally adequate. Hydrocarbon reducing gases such as methane, for example, are not particularly useful. Even at total pressures as high as 900 p. s. i., at temperatures where either hydrogen or carbon monoxide are effective, methane and the like do not precipitate metal. The necessary use of higher temperatures and pressures does not eliminate their use, but makes it unlikely, as being uneconomical.

In general, therefore, the use of hydrogen, carbon monoxide, or mixtures of them, will constitute the most desirable and the most commonly encountered practice.

In the present process, reduction is ordinarily carried out in agitated vessels capable of withstanding about 1000 p. s. i. or higher total pressures. Economically, therefore, it is desirable to complete a reduction in the shortest practicable time and conditions are usually adjusted to obtain adequately complete reduction within a relatively short time. Preferably, this should be about one half hour or less. Where this is not possible, longer reduction times, up to about two hours, may be necessary. Conditions discussed herein as optimum, therefore, will be those which will secure the desired degree of reduction in from about one-half to two hours.

While in many cases, if treatment conditions are maintained sufficiently longer than two hours, reductions can be carried out at lower temperatures and pressures and on solutions of non-optimum composition, there is no economical justification for so doing. Conversely, in most cases, reduction can be carried out in less than one-half hour, particularly if sufficiently higher temperatures and pressures are used. However, the additional heat, and usually the additional strength of the vessel required, offsets any real economic gain from such a saving in time.

In supplying the reducing gas, it is desirable to maintain its partial pressure above the fluid in the reaction vessel at about one atmosphere or higher until the end of the reaction period. While it may be possible, in some cases, to obtain some reduction to metal in the presence of a smaller amount of gas, hydrogen for example, the one atmosphere limit is not ordinarily worth attempting to lower. Ordinarily, even high pressures, initially up to about 300–500 p. s. i. are desirable. When and if an adjustment is necessary during the course of the reduction it may be accomplished by (a) raising the partial and total pressure through the introduction of more reducing gas; (b) reducing the total pressure by bleeding gas from the vessel; or (c) combinations of both. The exact procedure can be determined by measuring the content of the vapor phase.

Some agitation of the solution is desirable. Adequate contact between the reducing gas and the solution must be obtained. This is facilitated by addition of the reducing gas below the liquid surface. It is further aided if the added gas is dispersed by the agitator. Inspiration of the gas from above the liquid by the agitator is also desirable. Agitation is generally helpful to the reduction reaction. However, when reduction conditions are such that the powder formed is fine in size, prolonged agitation beyond the point where reduction is complete should be avoided because such fine particles tend to build up soft deposits on the equipment and/or agglomerate into masses having a low density. The degree of agitation, therefore, needs to be controlled to obtain the mixing required for rapid reduction. It should not be too intense nor should it be continued for a sufficiently prolonged period to produce a deleterious effect on the product metal.

In the practice of this invention, the optimum conditions may vary somewhat for each element which is to be precipitated as metal. Accordingly, optimum conditions will be separately illustrated in the following examples, as to the desirable procedure to be used in the production of each of the illustrative metals. This will not only illustrate the practical applications of the invention but also the general characteristics of the process.

In discussing the practices of this invention, it should be noted that there are many ions which can be present in solution in small amounts without adversely affecting the desired reduction. There may be, for example, cations of various metals above cadmium in the electromotive force series. However, they must be soluble. Other anions may be present, provided they do not limit the solubility of the metal being reduced or react with the reducing gas. However, since large quantities of any such extraneous salts will reduce the solubility of the desired materials and slow down the reaction rate, they should be avoided wherever possible, even though they do not enter into the reaction.

The term "compatible electrolyte" as used herein is intended to designate an acid and/or salt thereof meeting several certain requirements. First, it must furnish an anion capable of forming a gas reducible ion with the dissolved metal to be precipitated. Secondly, it must be soluble in the solution without causing a premature precipitation or crystallization of any dissolved component. This necessitates its being compatible with all of the dissolved components. In the case of sulfate solutions, sulfuric acid itself or salts formed in neutralizing an excess of it such as sodium, potassium and ammonium sulfates may serve the purpose. Any of such would be a "compatible sulfate."

In discussing the examples given below, the solutions used are usually those containing only one metal which is gas-reducible under the conditions used. Otherwise, conditions optimum for the metal product precipitation need not produce a pure metal product. However, other gas-reducible metals may be present, in certain circumstances. One such situation is when their reduction in conjunction with the desired metal gives a useful alloy product. In some cases also, they may be present in amounts which it is not practically worthwhile to remove, either because of the small quantity involved or because their presence in the desired metal product would not adversely affect its subsequent sale or use. In other cases, the metals may be separately precipitated by the preferential reduction processes of the copending applications for United States Letters Patent Serial No. 276,711 of F. A. Schaufelberger, now Patent No. 2,694,005, and 276,712 of F. A. Schaufelberger and P. J. McGauley, now Patent No. 2,694,006, both filed of even date.

COPPER REDUCTION

Commercially, pure copper is largely obtained from treatment of sulfide ores, oxidized ores or secondary metals. From the leaching of sulfide ores or concentrates, copper is usually obtained as a sulfate solution, which may also contain ammonium sulfate and either free ammonia or free sulfuric acid. In the leaching of oxidized ores, secondary metals or other crude forms of copper the solution obtained may be similar or it may be an ammoniacal carbonate solution. Therefore, an aqueous solution containing copper sulfate and/or carbonate ions and ammonia, the latter present largely in a complex with the copper and as the ammonium ion, will be used as illustrative.

Solution composition

Various copper salts may be encountered. Sulfates and carbonates will be taken as illustrative. Copper, as sulfate, is soluble either in acid solutions or in basic solutions containing a complex forming amine, usually ammonia, up to about 100 g./l. at ambient temperatures and to a greater extent at some elevated temperatures.

Both cuprous and cupric carbonates are soluble in ammoniacal solutions. Such solutions, containing both, can be prepared with over 200 g./l. of dissolved copper at ambient temperatures. At increasing temperatures both are less soluble, the solubility of cuprous copper decreasing faster. Therefore, on heating to temperatures above the atmospheric boiling point, which, as will be shown, is necessary for reduction to metal in a reasonable time, copper in excess of about 135–150 g./l. precipitates as some copper compound, usually an oxide. This occurs either immediately, or when during reduction, by metal or hydrogen, sufficient cupric copper is reduced to cuprous condition to cause the total cuprous copper present to exceed the solubility limit. For example, in the following Table I are given illustrative values of $NH_3$, $CO_2$ and $Cu^+$ (expressed as $Cu_2O$) which, if not exceeded as to cuprous copper content, will not precipitate cuprous oxide within ten minutes on heating such solutions to about 350° F.

TABLE I.—LIMITS OF OXIDE PRECIPITATION FOR THE SYSTEM ($Cu_2O$-$NH_3$-$CO_2$)

| Mol Percent | | | $NH_3/CO_2$ ratio |
|---|---|---|---|
| $Cu_2O$ | $CO_2$ | $NH_3$ | |
| 0 | 0 | 100 | ∞ |
| 3 | 7 | 90 | 12.9 |
| 4.5 | 10.5 | 85 | 8.1 |
| 6 | 14 | 80 | 5.7 |
| 7.5 | 17.5 | 75 | 4.3 |
| 7.75 | 22.25 | 70 | 3.1 |
| 7.75 | 27.25 | 65 | 2.4 |

The data shown in Table I are for solutions in which the maximum cuprous copper content was about 135 g./l. For solutions of other dilutions, the mol percentage of $Cu_2O$ will differ and is likely to be lower. Continued heating of the solution at this temperature will be accompanied by a slow continued precipitation of $Cu_2O$ until the cuprous content of the solution has decreased to about 90 g./l. It should be noted that if carbon monoxide is present, a cuprous complex is formed and no oxide will precipitate under otherwise similar circumstances.

If copper compounds are precipitated on heating they are reduced to metallic copper during continued reduction. In general, this practice is not desirable because the resultant metal product is a light, fluffy, dendritic powder of poor physical characteristics and has a marked tendency to carry diluent impurities. Therefore, in the preferred practice the solution, whether carbonate, sulfate or other salt, should be below copper saturation, sure of the solution and may unduly retard the reaction. Therefore, excessively large amounts will require heavier and more expensive equipment to retain the reaction at reduction temperatures. Illustrative data on the effect of variations in $NH_3$ or in $CO_2$ content for copper ammoniacal carbonate solutions of differing cuprous/cupric ratios are shown in Table II.

TABLE II.—EFFECT OF VARIATIONS IN $NH_3$ OR $CO_2$ CONTENT ON REDUCTION
[Percent reduction (with $H_2$ at 350° F. and 900 p. s. i. for 75 min.)]

| g./l. $CO_2$ | 147 g./l. $Cu^{++}$ 0 g./l. $Cu^+$ (155 g./l. $NH_3$) | 104 g./l. $Cu^{++}$ 52 g./l. $Cu^+$ (155 g./l. $NH_3$) | 49 g./l. $Cu^{++}$ 47 g./l. $Cu^+$ (145 g./l. $NH_3$) | 0 g./l. $Cu^{++}$ 156 g./l. $Cu^+$ |
|---|---|---|---|---|
| 70 |  |  | 98 |  |
| 80 |  |  | 97 |  |
| 90 | 75 | 96 | 98 |  |
| 100 | 77 | 98 | 98 |  |
| 110 | 79 | 90 | 98 |  |
| 120 | 76 | 75 | 90 |  |

| g./l. $NH_3$ |  | (110 g./l. $CO_2$) | (105 g./l. $CO_2$) | (100 g./l. $CO_2$) |
|---|---|---|---|---|
| 110 |  |  | 78 | 55 |
| 120 |  | 86 |  |  |
| 130 |  | 96 |  |  |
| 140 |  | 99 | 98 | 66 |
| 150 |  | 99 | 98 | 80 |
| 160 |  |  | 98 | 80 |
| 170 |  | 99 |  |  |
| 180 |  |  | 99 | 80 |
| 190 |  |  |  |  | both at ambient and reduction temperatures. If stronger solutions are to be used, their preparation and handling must be at a controlled temperature to avoid this undesirable precipitation of copper salts or oxides. In general, then, of the commonly encountered solutions, sulfates will preferably be below about 100 g./l. of copper, carbonate liquors below about 130 g./l. It is seldom desirable for economic reasons to treat solutions of less than about 20 g./l.

Other dissolved contents may vary. For example, copper metal may be successfully reduced from solutions of widely varying hydrogen ion content. Accordingly, the solutions may range from strongly basic amine solutions, containing much free ammonia or other amine, to those containing large amounts of free acid. Moreover, regardless of the pH or anion present, it is desirable that the solution should, and it usually will, contain some dissolved salt other than those of the metal, usually ammonium salts.

It would appear that, at least in the initial stages, retarding the speed of reduction produces a better, more dense product metal. These salts produce the desired result. For dilute solutions as little as 0.1 M/l., for concentrated solutions about 0.5 M/l., produces an observable improvement causing product copper metal powder to be denser and more granular than the spongy metal obtained when it is absent. On the other hand, a large excess should be avoided. While ammonium salts are soluble up to 4 M/l., or more, at ambient temperatures without substantial reduction in copper salt solubility, reduction to metal from solutions high in ammonium salts requires more stringent reducing conditions to obtain an equal yield. Accordingly, good practice will make use of some 0.1–2.5 M/l. of ammonium salts or their equivalents.

Reduction may be initiated in basic solutions containing free amines, i. e., ammonia. Some free ammonia is necessary if reduction is to be initiated on the basic side whatever the anion. The criteria differ somewhat for different anions, however. Cuprous sulfates and carbonates will be taken as illustrative.

In carbonate solutions the amine content may be large. For example, reduction has been obtained at free ammonia concentrations up to nine M/l. However, increasing the content of free ammonia increases the vapor pressure of the solution and may unduly retard the reaction. Therefore, excessively large amounts will require heavier and more expensive equipment to retain the reaction at reduction temperatures.

Defining the desirable amount of either $CO_2$ or $NH_3$ to be present cannot be done without reference to each other or to the amount of dissolved copper. If the $CO_2$, and hence the $(NH_4)_2CO_3$ content, is too high, the reduction rate is impaired, especially at high cupric/cuprous ratios. However, the results shown in Table II may be influenced by cuprous oxide precipitation and should not be extrapolated for application to more dilute copper concentrations or to solutions of other salts.

For carbonate solutions, the maximum mol ratio of $CO_2$/Cu initially present which permits production of pure granular copper powder ranges from about 0.8 for solutions containing 2 mols total $NH_3$/mol of Cu to about 1.5 for solutions containing 6 mols total $NH_3$/mol of Cu. In general, the optimum total ammonia content will be found at about 4 mols $NH_3$/mol Cu which will provide up to about 3.8 mols free $NH_3$/mol Cu. For higher $CO_2$ contents it has been found that part of the copper product obtained is apt to consist of an undesirable foil like deposit on the wetted surface of the apparatus.

By way of comparison, for solutions of sulfates, if reduction is to be started on the basic side, it is usually found that ammonia content need not be quite as high as for carbonates. At less than about 1.8 mols free $NH_3$/mol of Cu, the solution is no longer basic. From this ratio up to about 3–5 works well, but there is no particular utility in using an excess.

Other metal salts may also be present. They may even replace a part of the ammonium salts just discussed and contribute to the success of the copper reduction, provided the cation is not gas-reducible under the reduction conditions and the anion does not react with the reducing gas. However, the presence of excessive amounts of any extraneous salts should be avoided as tending to reduce the solubility of copper in the solution. When other elements which may form amine complexes are present, the solution composition has to be adjusted to meet their requirements in addition to those for the copper.

This effect is easily shown. Frequently some Zn is found in some ammoniacal copper carbonate solutions. A series of copper-zinc solutions containing some 160 g./l. of dissolved metal in differing Cu/Zn ratios and about 105 g./l. of $CO_2$, 150 g./l. of $NH_3$ and a $Cu^{++}/Cu^+$ ratio of one are subjected to reduction for about 75 minutes at about 350° F. and 900 p. s. i. total pressure, using hydrogen. Illustrative results are shown in Table III.

TABLE III.—EFFECT OF Zn PRESENT DURING Cu REDUCTION

| G./l. Zn: | Per cent reduction of Cu |
|---|---|
| 10 | 80 |
| 20 | 87 |
| 30 | 90 |
| 40 | 93 |
| 50 | 94 |
| 60 | 94 |
| 70 | 94 |

Under the test conditions, the presence of zinc produced a marked improvement. However, for solutions appreciably more dilute as to copper, or in which the $NH_3$ and $CO_2$ content is too low to retain the zinc, this beneficial result would not be expected.

In addition to these questions of copper solubility, the content of amine and the extraneous salt content, all of which have been noted for basic solutions of salts such as the carbonate and sulfate, the question of free acid content must be noted. Anions such as sulfate form salts which are both stable and soluble in acid solutions. The solution may be highly acidic. Reduction of copper is possible at hydrogen ion contents equivalent to those of solutions containing up to about 170 or more grams $H_2SO_4/kg.H_2O$. However, at these or higher $H^+$ contents the sulfate ion may be reduced to sulfide and the copper powder may contain copper sulfide. When copper is reduced with either hydrogen or carbon monoxide, a stoichiometric amount of acidic anions are released, acid forms and the $H^+$ concentration increases. It is desirable, therefore, to avoid starting with a solution that is too acid. Otherwise, the $H^+$ content may become too high for reduction to copper metal alone while a large amount of copper is still in solution.

It may be noted that high free acid, high ammonium sulfate, high temperature and longer time tend to increase the sulfide content of the copper metal product. Thus, it is best to avoid exceeding 17% free sulfuric acid, which can easily be done. However, if for some reason, it is desired to operate under such conditions, the solution should be low in ammonium sulfate and high temperature and excessive retention times should be avoided. For instance, a temperature of about 450° F. should not be exceeded for more than about 30 minutes.

As noted, some ammonium sulfate is normally present. However, in adjusting the solution, care should be exercised to avoid low $NH_3$ concentrations and low free acid concentrations as the ammonium sulfate concentration approaches saturation. Otherwise, the copper ammonium double salt may be precipitated.

*Reduction conditions*

Any non-sulfidizing reducing gas may be used. The preferred reducing gases in the practice of this invention are hydrogen, carbon-monoxide and mixtures thereof. The partial pressure of the reducing gas need not be high in order to reduce copper from its solutions; however, an appreciable pressure may be needed to reduce any cuprous oxide precipitated. Four illustrative tests were made in an autoclave which had been adjusted to be free of leaks. The solution was heated to boiling and the autoclave purged of air by steam. The vent was then closed and the autoclave heated to reduction temperature. An over pressure of 200 p. s. i. of hydrogen was added and the hydrogen valve closed. Time for the pressure to drop back to the initial vapor pressure was noted. The autoclave was then cooled and the residual pressure noted. Data are given in Table V.

TABLE V

| Solution, M./l. | | | Temp., ° F. | Time, Min. | Residual Pressure | Remarks |
|---|---|---|---|---|---|---|
| Cu | $NH_3$ | $H_2SO_4$ | | | | |
| 1.4 | -- | 1.4 | 425 | 10 | <1 atmos. | Bright metal. |
| 1.4 | -- | 0.5 | 375 | 18 | ---do--- | Do. |
| 1.5 | 1.25 | ----- | 375 | 23 | ---do--- | Oxide+metal. |
| 1.07 | 2.14 | ----- | 425 | 13 | ---do--- | Do. |
| 1 (as $Cu_2O$) | -- | ----- | 400 | 150 | 50 | No metal observed. |

In order to illustrate the effect of varying amounts of free acid, ammonium sulfate, copper sulfate and temperature, various samples of a copper solution were subjected to reducing conditions with $H_2$ for 30 minutes at a total pressure of about 900 p. s. i. The calculated final acid assumes the product to be copper metal, without correction for copper sulfide. The actual acid at the end of reduction is less than the calculated value due to corrosive attack of the acid on equipment used. Illustrative results are shown in Table IV.

Also in Table V is a test on reagent grade, cuprous oxide in which no reduction occurred below 50 p. s. i. Under acid conditions the reaction rate was high even when the partial pressure of reducing gas was less than 15 p. s. i. Under acid conditions, cuprous oxide was soluble and, hence, not precipitated. However, under basic conditions, especially in the absence of ammonium sulfate, cuprous oxide was precipitated, and although some metal was produced, it was mixed with oxide. Therefore, under conditions where oxide precipitates, a reducing gas pres-

TABLE IV.—EFFECT OF ACID CONCENTRATION ON COPPER REDUCTION

| Initial M./l. | | | Temp., ° F. | Percent Reduced | Final g./l. | | | Percent S |
|---|---|---|---|---|---|---|---|---|
| $CuSO_4$ | $H_2SO_4$ | $(NH_4)_2SO_4$ | | | Cu | $H_2SO_4$ | | |
| | | | | | | Found | Calc. | |
| .5 | .2 | 0 | 400 | 99.5 | .3 | ---- | 70 | .074 |
| 1.75 | .2 | 0 | 450 | 99.0 | .47 | ---- | 93 | .025 |
| .5 | .3 | 0 | 400 | 99.5 | .3 | ---- | 80 | .05 |
| 1.75 | .5 | 0 | 450 | 98.7 | .61 | 100 | 123 | .085 |
| 1. | .2 | 0 | 400 | 94.8 | 3.2 | 111 | 114 | <0.01 |
| 1.5 | .2 | 0 | 400 | 95.4 | 4.4 | 127 | 167 | .038 |
| 1.75 | .8 | 0 | 450 | 99.5 | .3 | 138 | 153 | .005 |
| 1.75 | 1.4 | 0 | 450 | 99.4 | .3 | 170 | 213 | .74 |
| 2. | .2 | 0 | 400 | 95.8 | 5.3 | 171 | 208 | <0.01 |
| .5 | .2 | 1 | 400 | 99.5 | .3 | 62 | 70 | 0.034 |
| .5 | .2 | 2 | 400 | 99.0 | .6 | 63 | 70 | 0.12 |

[1] These tests for 2 hours.

sure above 50 p. s. i. and preferably 300-500 p. s. i. is desirable to obtain oxide free metal.

Another important factor is the temperature. Reduction can be obtained at a lower average temperature with carbon-monoxide than with hydrogen. Indeed cuprous sulfate solutions may be reduced with carbon-monoxide at room temperature. However, to secure a reasonable reaction rate with either CO or $H_2$, the temperature should be above about 250° F.

To illustrate this, samples of a sulfate solution were reduced at different temperatures for 45 minutes under 500 p. s. i. partial pressure of $H_2$. Typical illustrative results are shown in Table VI.

TABLE VI

| Gas | Temp., °F. | Percent Reduction |
|---|---|---|
| $H_2$ | 400 | 100 |
| $H_2$ | 345 | 85 |
| $H_2$ | 250 | 30 |

For hydrogen reduction of similar sulfate liquors a better practice is to use from about 350°-500° F. with about 400°-450° F. constituting about a general optimum. Sulfate solutions can be reduced with $H_2$ at optimum temperatures and about 900 p. s. i. total pressure, to obtain about 100% yield of copper within 15 minutes under acid conditions. If free $NH_3$ is present the reduction will take two-four times as long. The reduction can be accomplished even faster at higher temperatures and pressures but the decrease in reaction time is not enough to permit operation above about 450°-500° F. and at 900 p. s. i. to be as economical.

For reduction of carbonate solutions, a lower temperature is ordinarily optimum. As copper metal precipitates, both the free ammonia and the ammonium carbonate content of the solution increase. If the initial solution contains a normal optimum 130 g./l. copper and is reduced at some 200°-350° F. and up to 900 p. s. i., after some 60-70% of the copper has been reduced, the reaction rate has become very slow, substantially negligible. For example, one reason is that the increasing content of free ammonia and ammonium carbonate causes the $NH_3$ and $CO_2$ partial pressures to rise so that for constant total pressure, the reducing gas partial pressure becomes too low for a useful rate. In addition, the rate of reduction of the complex appears to be some inverse power function of the non-complexed free ammonia which varies as the metal precipitation proceeds.

Ammine carbonate solutions are normally obtained in leaching cycles which add no anion. Therefore, the solution is recycled to dissolve additional copper in the next cycle. This can be done economically after only some 60-70% of the copper has been removed as product metal. Accordingly, the question of completeness of precipitation is not as important as it is in the case of liquors obtained by oxidation leaching of sulfides in which the anion is formed in the process.

Yields above 60-70% in the reduction of carbonate liquors can be obtained by using lower temperatures for longer times or by using a higher operating pressure. Alternately, $NH_3$ and $CO_2$ can be removed by venting the autoclave to a lower total pressure, and applying an adequate reducing gas pressure to finish the reduction. The vented gases can be condensed and redissolved for reuse in leaching if so desired.

A somewhat similar limit applies to the CO reduction of acid sulfate solutions high in copper which ordinarily may be completely reduced. The $CO_2$ produced by the reaction accumulates in the vapor phase. If it is allowed to accumulate to too great a partial pressure, it may lower that of the reducing gas and limit the yield. For example, in treating a one molar solution in an autoclave two-thirds filled with liquid at 900 p. s. i., only 90% reduction is obtained in 30 minutes unless $CO_2$ is removed as by venting. In ammoniacal sulfate solutions, however, enough $CO_2$ will remain in solution so that the yield is not limited for this reason.

*Product powder properties*

The properties of the powder obtained differ both with the reducing gas used and the nature of the solution. For carbonate solutions of optimum composition, when using hydrogen alone, the copper powder has an average particle size of about 325 mesh and usually a bulk density of about 1.5 g./cc. Using carbon monoxide, much coarser powder can be made, a typical product having an average particle size of about 100 mesh and a bulk density of about 3 to 4.5 g./cc. Mixtures of reducing gases will give intermediate results. For sulfate solutions, powder obtained with $H_2$ averages about 200 mesh and has a density of 2.5 g./cc. or more, while with CO very coarse, dense powder or pellets can be made.

Excessive or prolonged agitation should be avoided for several reasons. For example, if the powder is allowed to form in too fine a particle size, i. e., all below about 400 mesh, the small particles tend to agglomerate and thereby occlude or absorb impurities from the liquor, when subjected to excessive or prolonged agitation. Again, when carbon-monoxide is used, excessive agitation during the period when the reduction rate is low may result in the formation of large balls of copper which contain unreduced solution in their interior. These difficulties can be avoided to a large extent by changes in the agitation rate. However, it is better to adjust the solution to prevent the occurrence of conditions which incur these poor results.

Excessively fine powder precipitation can be avoided by doing the reduction under conditions which give a slower rate. This is accomplished by either or both of two alternatives. One is the addition of salts, as discussed above, usually a salt of the complexing material such as an ammonium salt of the same acid for basic conditions or of a compatible anionic complex-forming acid under acid conditions. The other is to avoid an excessive hydrogen ion concentration, i. e., by minimizing the amount of free acid present during the reduction.

The striking formation of ball-like products during prolonged agitation when using CO to reduce carbonate liquors only under conditions where plating or foil production is likely to occur. This can be avoided in part by the use of seed metal powder. It can also be minimized by avoiding an excessive extraneous salt and/or free ammonia content, and operating more nearly at the optimum conditions outlined above.

Reduction to copper metal can be accomplished for any original cuprous:cupric ratio in solution. However, for optimum results some control is needed. For example, as noted in Table I, in treating ammoniacal copper carbonate solutions containing over the optimum of about 130 g./l. total copper, some copper oxide may precipitate on heating to above 350° F. More of the copper precipitates as oxide when all of the copper is cuprous, its oxide being less soluble than cupric oxide. However, from solutions containing some cupric copper the precipitate, although smaller, will, nevertheless, contain some CuO. While, as noted, an oxide precipitate can be reduced to metal with $H_2$, the metal powder formed is poor in quality and reduction is slower. Furthermore, the oxygen content of the product copper is greatest for solutions high in cupric copper. Under comparable conditions the copper powder product will ordinarily contain less oxygen if the cuprous:cupric ratio is above about two when the solution is heated prior to reduction. Under the preferred conditions the $O_2$ content in the precipitated powder may be lowered to 0.001% or less.

The cuprous:cupric ratio may, if necessary be adjusted by contacting the solution with a metallic copper bearing material. This may be product copper powder or a metallic copper bearing material obtained from another source. The treatment may be conducted by agitating the powder in the solution or by passing the solution through a bed thereof or in any other suitable manner.

In addition to the adverse effect on reduction rate and product properties, oxide precipitation from carbonate solutions is undesirable for other reasons. Some impurities in carbonate leach liquors precipitate quickly on heating. They are readily removed as by filtration if the copper oxides precipitate is not large enough to cause excessive loss. On the other hand, a trace of oxide precipitate seems to favor metal reduction. As noted above, an optimum carbonate solution should not give an oxide precipitate immediately on heating. This permits impurities to be coagulated and filtered out without appreciable copper loss. An optimum solution, however, will form a slight precipitate of cuprous oxide after about 10–20 minutes at reduction temperature.

When CO comprises the reducing gas the small cuprous oxide precipitate may not appear on heating. When using CO there is usually some present in the solution from previous operations. If so, rather than precipitation of the oxide, some soluble cuprous carbon monoxide complex appears to be formed. This simplifies the heating problem. Further reduction from such solutions is readily initiated. Hence there is a wider latitude in solution composition which can be used efficiently when the reduction is done with carbon monoxide. Also the oxygen content of the final copper powder is easily kept well below 0.01%.

From the foregoing, it may be summarized that an initial solution should contain approximately the contents in g./l. indicated in the following Table VII and be treated at the indicated conditions.

TABLE VII

| | Content of Adjusted Copper Solutions (g./l.) | | | | | |
|---|---|---|---|---|---|---|
| | Carbonates | | | Sulfates | | |
| | Range | Optimum | | Range | Optimum | |
| Reducing Gas Used | | $H_2$ | CO | | $H_2$ | CO |
| Total Copper | 20–200 | 130 | 130 | 20–100 | 75 | 75 |
| Cuprous | 0–200 | (1) | (1) | 20–100 | (2) | (2) |
| Cupric | 0–150 | | | 20–100 | | |
| $NH_3$ | 10–220 | 165 | 165 | 0–220 | 75 | 65 |
| $CO_2$ for basic | 15–150 | 110 | 110 | | | |
| $SO_4$ Systems [3] | | | | 40–220 | 130 | 130 |
| Free $H_2SO_4$ (acid systems) | | | | 0–170 | 0–20 | 0–20 |
| Temperature (° F.) | 250–500 | 350 | 300 | 250–550 | 400 | 375 |
| $H_2$ part. pres. (p. s. i.) | 50–1,000 | 300 | 300 | 10–1,000 | 300 | 300 |

[1] Cuprous-cupric ratio should be above about 2.
[2] Cuprous-cupric ratio irrelevant for sulfates.
[3] For basic solutions containing ammonium sulfate.

Illustrative examples of reduction from copper carbonate solutions are shown below in Table VIII. In tests A and C the reducing gas was $H_2$ supplied at initial partial pressures of about 540 p. s. i. and 570 p. s. i. respectively, the final partial pressures after cooling were 250 p. s. i. at 140° F. and 350 p. s. i. at 95° F. respectively. In test B the gas was CO at an initial partial pressure of about 520 p. s. i., a final partial pressure of 0 at about 140° F. due to dissolution.

TABLE VIII.—REDUCTION OF COPPER FROM $NH_3$ AND $CO_2$ SOLUTIONS

Part 1.—Reduction conditions and solution composition

| Test No. | Sample | Solution Composition (g./l.) | | | | | Yield, Percent Cu | Remarks |
|---|---|---|---|---|---|---|---|---|
| | | Total Cu | As Cu+ | $NH_3$ | $CO_2$ | Zn | | |
| A | Head | 114 | 55 | 165 | 125 | 37.5 | | Heat up 16 min. Heel of powder from previous run in clave. |
| | at 350° | 133 | 64 | 158 | 130 | | −17 | |
| | +30 min. | 92 | 84 | 143 | 96 | | 19 | |
| | +60 min. | 62 | 57 | 139 | 89 | | 44 | |
| | +90 min. | 46 | 48 | 137 | 89 | | 60 | |
| B | Head | 122 | 52 | 181 | 127 | 31 | | Heat up 25 min. Heel from previous run in clave. |
| | at 350° | 118 | 88 | 147 | 107 | | 3 | |
| | +30 min. | 98 | 75 | 148 | 113 | | 20 | |
| | +60 min. | 74 | 63 | 150 | 123 | | 39 | |
| | +90 min. | 56 | 52 | 146 | 118 | | 54 | |
| C | Head | 128 | 83 | 186 | 127 | 23 | | Heat up 28 min., $H_2$ at 0.5 Cu. Ft./min. fed, vent to maintain 900 psi. |
| | at 350° | 142 | 93 | 168 | 124 | | −11 | |
| | +58 min. | 66 | 59 | 141 | 77 | | 48 | |
| | +104 min. | 37 | 34 | 141 | 64 | | 71 | |
| | +141 min. | 20 | 14 | 113 | 54 | | 84 | |

Part 2.—Copper powder handling [1] and analyses

| | Test No. | | | Product Size (Screen Mesh) | A, Weight Percent | B, Weight Percent | C, Weight Percent |
|---|---|---|---|---|---|---|---|
| | A | B | C | | | | |
| Density, g./cc. | 1.61 | 2.52 | 2.54 | | | | |
| Flowrate, sec./50 g | 39 | 34 | 35 | | | | |
| Percent Zn | Nil | Nil | | | | | |
| Percent Pb | 0.002 | 0.001 | 0.003 | | | | |
| Percent Sn | 0.03 | 0.03 | 0.004 | | | | |
| Percent Ni | 0.014 | 0.004 | | | | | |
| Percent Fe | Nil | 0.002 | Nil | | | | |
| Percent $O_2$ | 0.03 | 0.03 | 0.03 | | | | |
| Percent Cu | 99.90 | 99.92 | 99.93 | | | | |
| | | | | +60 | 0 | 5 | 29 |
| | | | | −60+80 | 1 | 47 | 21 |
| | | | | −80+100 | 10 | 28 | 15 |
| | | | | −100+140 | 18 | 14 | 15 |
| | | | | −140+200 | 20 | 4 | 13 |
| | | | | −200+230 | 8 | 1 | 4 |
| | | | | −230+270 | 6 | tr | 2 |
| | | | | −270+325 | 10 | tr | 1 |
| | | | | −325 | 27 | tr | tr |

[1] In each test the copper powder produced is bright and practically free from oxygen, as filtered from the spent solution. Exposure to air during filtration oxidized the powder to a dull red. It was then washed successively with 0.5% $NH_3$ solution, with 5.0% $H_2SO_4$, 10% aqueous acetic acid and with water, then dried in a heated drum to which a small flow of $H_2$ was added. After 20 minutes the temperature was 212° F. and the water had been evaporated. Heating was continued 10 minutes more to a temperature of 500° F. Water was poured over the drum to cool it to 80° F., the $H_2$ was turned off, and the drum opened. The resultant powder was analysed.

Illustrative examples of reduction of copper sulfate solutions obtained by leaching sulfide ore concentrates is shown in Table IX.

TABLE IX.—COPPER POWDER FROM SULFATE SOLUTIONS

| | Liters | grs. | Analysis Percent or g./l. | | | | | Yield, Percent |
|---|---|---|---|---|---|---|---|---|
| | | | Cu | Fe | Free $H_2SO_4$ | Total S | $O_2$ | |
| Leach Liquor | 1.6 | | 42 | 72 | | 43 | 82 | |
| Barren Liquor | 1.1 | | 2.2 | 57 | | 92 | 67 | |
| Cu Powder | | 24 | 99.90% | 0.027% | | | 0.06% 0.01% | 96.3. |
| Leach Liquor | 0.65 | | 92 | 17 | | 89 | 91 | |
| Barren Liquor | 1.04 | | 0.3 | 16 | | 138 | 55 | |
| Cu Powder | | 40 | 99.91% | 0.015% | | | 0.005% 0.03% | 99.5. |
| Leach Liquor | 1.1 | | 76 | 22 | | 86 | 74 | +10 g. powder. | 99.9% Cu as seed. |
| Barren Liquor | 1.18 | | 0.2 | 21 | | 75 | 72 | | |
| Cu Powder | | 75 | 99.92% | 0.008% | | | 0.02% 0.02% | 99.8. |

Note.—Leach liquors obtained by oxidation leaching of chalcopyrite concentrate. Reduction with $H_2$ at 400° F. and at 800 p. s. i. (total) for 30 minutes. The product powders were washed in water and dried in a hydrogen atmosphere before analysis. Barren liquor volumes shown include some wash water.

NICKEL REDUCTION

Nickel metal is normally produced from sulfide, oxide or silicate ores. The present invention can be practiced on any leach solutions from these ores or their mineral dressing or pyrometallurgical concentrates. Nickel will most commonly be encountered only in a sulfate or carbonate solution, the former usually and the latter always containing free ammonia. As in the case of copper, other anions may be present in ammoniacal solutions, except those which form an undissociated complex with the metal or react with the reducing gas. In acidic solutions, fluosilicate, acetate or other anions which give adequate nickel solubility may be used if they do not react with the reducing gas. Again, strong mono-basic acids such as nitric and hydrochloric are not commercially useful, although they can be made operable from ammoniacal solutions.

The practice of the present invention will be discussed for nickel solutions containing sulfate and/or carbonate, with ammonia present as the typical amine, both in complex ions with nickel and as ammonium ions. Again the first principal step is to adjust the solution composition to an approximation of the optimum conditions.

Adjusted solution composition

Nickel is soluble in water as a sulfate to the extent of some 90–100 g./l. Ni under ambient conditions. Its solubility is somewhat reduced by the presence of appreciable amounts of free sulfuric acid but its solubility increases with rising temperature. Nickel is soluble to about the same extent in carbonate solutions if enough free ammonia is present. The solution, therefore, ordinarily should contain less than about 100 g./l. nickel to avoid precipitation prior to reduction. Otherwise it must be made up and handled at increased temperatures. Solutions containing less than about 10 g./l. Ni, although technically practical, are ordinarily uneconomical.

The concentration of nickel in the solution does not appear to affect appreciably the velocity of reduction under optimum conditions. To illustrate this fact, a series of solutions containing varying amounts of nickel and about two mols of ammonia per mol of nickel were slurried with about 100 g./l. of nickel seed powder and the slurry was reduced with hydrogen gas at about 350° F. with a total pressure of 500 p. s. i. Typical results which show the time required to precipitate all of the metal from solutions containing various amounts of nickel are illustrated in Table X. It will be seen that the time required is roughly proportional to the nickel initially present.

TABLE X.—EFFECT OF NICKEL CONCENTRATION ON TIME OF REDUCTION

| Nickel (g./l.) | 80 | 63 | 40 | 18 | 7 |
|---|---|---|---|---|---|
| Reduction Time (Min.) | 60 | 40 | 25 | 15 | 7 |

An adjusted ammoniacal nickel sulfate solution, containing ammonia-nickel complex ions, whether derived from an ammonia leach liquor, or from an acid leach liquor which has been neutralized with ammonia, or by dissolving nickel ammonium-sulfate in aqua-ammonia, should contain both free ammonia and ammonium sulfate to obtain the best results. Even if the solution initially contains no ammonium sulfate, sulfuric acid and ammonia are liberated from the complex during reduction and form ammonium sulfate.

Illustrative examples of the effect of variations in the concentrations of ammonium sulfate and free ammonia on the reduction of nickel from such solutions are shown in Table XI.

TABLE XI.—EFFECT OF FREE $NH_3$ AND $(NH_4)_2SO_4$ ON REDUCTION OF Ni FROM SULFATE SOLUTION

| Initial Solution Content (M/l.) | | | Reduction Conditions | | | | Ni Product, Percent Yield |
|---|---|---|---|---|---|---|---|
| Ni | $NH_4$ | Free $NH_3$ | ° F. | Total P. s. i. g. | Gas | Time (Min.) | |
| 1.35 | 2.7 | 2.8 | 450 | 800 | $H_2$ | 60 | 98.6 |
| 0.89 | 1.8 | 4.65 | 450 | 800 | $H_2$ | 60 | 76.3 |
| 0.89 | 1.8 | [1] 4.65 | 450 | 800 | $H_2$ | 60 | 55.6 |
| [2] 1.2 | 0 | 1.2 | 400 | 700 | $H_2$ | 60 | [3] 60 |
| 1.2 | 0 | 2.4 | 400 | 720 | $H_2$ | 10 | 100 |
| 1.2 | 0 | 3.6 | 400 | 750 | $H_2$ | 15 | 100 |
| 1.2 | 0 | 4.8 | 400 | 800 | $H_2$ | 30 | 100 |
| 1.35 | 0 | [4] 2.8 | 450 | 800 | $H_2$ | 60 | 98.3 |
| 1.35 | 2.7 | 2.8 | 450 | 800 | $H_2$ | 60 | 98.6 |
| 1.35 | 4.5 | 2.8 | 450 | 800 | $H_2$ | 60 | 92.6 |
| 1.35 | 6.3 | 2.8 | 450 | 800 | $H_2$ | 60 | 84.5 |
| 1.35 | 0 | 4.65 | 450 | 800 | $H_2$ | 60 | 90.0 |
| 1.35 | 1.8 | 4.65 | 450 | 800 | $H_2$ | 60 | 76.3 |
| 1.35 | 3.0 | 4.65 | 450 | 800 | $H_2$ | 60 | 34.5 |
| 1.35 | 4.0 | 4.65 | 450 | 800 | $H_2$ | 60 | 0 |

[1] Plus 100 p. s. i. $NH_3$ partial pressure=about 5 M/l.
[2] In tests 4–7 about 100 g./l. of nickel seed powder was slurried with the solution.
[3] Final solution contains about 4% free $H_2SO_4$.
[4] Final free $NH_3$ is only about 0.12 M/l. or 0.2%.

From these and similar tests it may be postulated: (a) that even with seeding, an $NH_3$/Ni ratio of more than one is required for good reduction rates but that ratios above about 2.0–2.1 tend to decrease the rate; (b) that at a good $NH_3$/Ni ratio of about 1.8–2.0, increasing the $(NH_4)_2SO_4$ content has no detrimental effect on the rate until the $NH_4^+$/Ni ratio reaches about three, above which ratio the rate decreases; and (c) that with higher $NH_3$/Ni ratios, i. e., above about 2.1, an $NH_4^+$/Ni ratio as low as two may adversely affect the rate.

Nickel has a tendency to plate on the walls and other wetted parts when reduction is conducted from solutions too high in $NH_3$ or ammonium salts. However, addition of nickel powder from a previous reduction as done in tests 4–7 of Table XI will provide sufficient nuclei to avoid this plating. This also will decrease the reaction period. Optimum rates appear to be obtained at free $NH_3$/Ni ratios of about two, although from about 1.4–4.0 may be used. In the test in which the $NH_3$/Ni mol ratio was reduced to only one, reduction stopped when the solution reached about 4% free acid although the solution still contained 28 g./l. of nickel. The adjusted solution should have had a higher ratio to prevent reaching this acid content before more of the nickel had been reduced, or ammonia added during reduction.

Illustrative results obtained in treating various ammonia deficient solutions containing ammonium sulfate with hydrogen at about 400°–450° F. and about 900 p. s. i. total pressure are summarized in Table XII. Reduction was carried out until the Ni reduction rate became negligible as determined by change in acidity. In the table the final acidity is correlated with the unreduced nickel.

TABLE XII.—EFFECT OF TERMINAL ACIDITY ON REDUCTION OF SULFATE SOLUTIONS

| Final H+ Content (Percent Free Acid) | Terminal pH | Final Nickel Content (g./l.) |
|---|---|---|
| 0.1 | 1.8 | 0.5 |
| 0.33 | 1.2 | 0.25 |
| 0.35 | 1.2 | 1.30 |
| 0.5 | 1.2 | 0.70 |
| 0.6 | 0.9 | 0.15 |
| 0.9 | --------- | 0.30 |
| 0.9 | --------- | 1.45 |
| 1.0 | --------- | 4.0 |
| 2.5 | --------- | 8.0 |
| 3.5 | --------- | 11.7 |
| 3.8 | --------- | 28.0 |

Nickel cannot be reduced to any appreciable extent from an aqueous sulfate solution containing about 5% free sulfuric acid or more. However, assuming for practical purposes that complete reduction is obtained when the Ni content is reduced to less than about one g./l., complete reduction is not obtained when more than about 0.9% free acid is present.

Attempts at reducing a nickel sulfate solution containing no free acid, free ammonia or ammonium sulfate, produces a reaction which stops at pH 1.8–2 after formation of a trace of acid. By adding ammonium sulfate or even sulfuric acid, reduction can be accomplished in the absence of free ammonia. Table XIII shows the effect of varying amounts of $H_2SO_4$ and $(NH_4)_2SO_4$. All tests were for one hour duration at 400° F. and 1000 p. s. i. total pressure using hydrogen. Nickel sulfate at 1 M/l. was present and 10 g./l. of nickel seed was added.

TABLE XIII

| Head | | Filtrate | | |
|---|---|---|---|---|
| $H_2SO_4$ (g./l.) | $(NH_4)_2SO_4$ (M/l.) | pH | $H_2SO_4$ (g./l.) | $H_2SO_4$ Produced g./l. |
| 9.60 | --------- | 1.28 | 5.72 | − 3.88 blank |
| 7.53 | --------- | 1.50 | 7.22 | + 3.57 |
| 14.5 | --------- | 1.23 | 13.2 | + 2.6 |
| 16.0 | --------- | 1.10 | 14.4 | + 2.3 |
| 0.57 | 0.2 | 1.08 | 15.4 | +18.7 |
| 0.23 | 0.5 | 0.84 | 29.0 | +32.7 |
| 0.23 | 1.0 | 0.70 | 37.6 | +41.3 |
| 5.85 | 0.2 | 1.20 | 16.6 | +14.6 |

The blank test was run to determine the amount of sulfuric acid consumed by corrosion of the autoclave. This amount, 3.88 g./l., was added to the filtrate analysis of each test to determine the total amount of acid produced.

The data show that sulfate ions, whether added as ammonium sulfate or sulfuric acid, permit the reduction to continue to a higher free acid content of solution before it ceases. It is presumed that an anionic complex of nickel such as $Ni(SO_4)_2^=$ is formed and that this permits the reduction to continue.

However, in acid solutions sulfate ions are converted to bisulfate ions which apparently do not form the complex and hence the reaction stops. The acidity to which the reaction proceeds, in the absence of free ammonia, depends on the concentration of sulfate ions.

In ammoniacal solutions the presence of some ammonium sulfate is also helpful. In the absence of ammonium sulfate, on adding $NH_3$ to a nickel sulfate solution, precipitation of some hydroxide is likely to occur. Further addition of ammonia will redissolve this precipitate. For such solutions, the necessary $NH_3/Ni$ mol ratio is reduced to about two when at least about 0.5 M/l. of ammonium sulfate is present. As noted above, however, an excessive amount should be avoided.

It has been noted that the optimum rate of reduction is obtained for solutions having an initial $NH_3/Ni$ mol ratio of about two. Reduction from solutions of about this ratio will also produce a dense nickel powder. When the initial ratio exceeds about four, or when the ammonium sulfate concentration exceeds about two molar, plating is sometimes encountered even when seed is used. When reduction is carried out in acid solutions, especially with a minimum initial ammonium sulfate concentration, and a gradual addition of ammonia to keep the terminating acid content from being reached, the nickel powder produced may be very fine. It may form spongy agglomerates on prolonged agitation. Under such conditions seed powder is not needed and if present has little beneficial effect.

When a solution initially containing two mols of ammonia per mol of nickel is reduced with hydrogen, the following reaction represents the overall result:

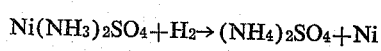
$$Ni(NH_3)_2SO_4 + H_2 \rightarrow (NH_4)_2SO_4 + Ni$$

Under these conditions the ammonia liberated from the complex combines with the sulfuric acid formed by the reduction to make ammonium sulfate, theoretically with no change in pH. However, good results are obtainable when the $NH_3/Ni$ ratio is from about 1.4–4. With higher ammonia contents the vapor pressure is increased, and for the same total pressure the partial pressure of reducing gas is decreased. For this reason and because of the adverse effect of free ammonia, the reaction rate is thereby decreased. For ratios less than about 1.5, particularly for concentrated solutions, reduction of nickel will make the solution too acid to complete the reduction.

As noted, some ammonium sulfate should be present. However, in adjusting the solution, care should be exercised to avoid low $NH_3$ concentrations and low free acid concentrations as the ammonium sulfate concentration approaches saturation. Otherwise, the nickel ammonium double salt may be precipitated.

When treating carbonate solutions, about the same original free ammonia and ammonium carbonate contents are desirable. However, one precaution should be noted. There will be a carbon dioxide vapor pressure to be allowed for. This is an additional reason why it is not desirable to decrease the $NH_3/Ni$ mol ratio to too far below about two.

*Reduction conditions*

In the reduction of nickel the use of carbon monoxide as the reducing gas is limited. In ammoniacal solutions at reduction temperature, nickel carbonyl is formed. Venting the autoclave not only will result in the loss of nickel but the carbonyl compound is dangerous. Although in acid solutions, the venting difficulties are not present, the carbonyl is not easily convertable to a satisfactory powder and it is still preferable to use hydrogen.

In order to obtain reduction economically, not only should the solution be of optimum composition but also the conditions of temperature, partial pressure of reducing gas, and extent of the application of agitation should be controlled. Each of these variables noticeably affects the reaction rate. Increasing the temperature and the reducing gas pressure as well as employing agitation all decrease the reaction time but increase not only the direct operating costs but also required strength of the equipment. Optimum conditions, therefore, are determined by an economic balance. This is done by increasing the temperature and extent of agitation until the savings through further decreasing the treatment time and necessary volume of equipment no longer outweigh the increase in operating costs.

The function of agitation is to ensure a reasonably uniform dispersion through the solution of the reducing gas and the nickel metal powder, both seed, if used, and product as it forms. To illustrate the effect of varying the agitation, reduction of an optimum solution, using 100 g./l. of seed, at 350° F. using 350 p. s. i. $H_2$ was carried out in a one gallon autoclave equipped with a stirrer. Time required for reduction to 0.1 g./l. of Ni was measured at different agitator speeds. Typical results are shown in Table XIV.

TABLE XIV

| Agitator speed, R. P. M. | Minutes for complete reduction |
|---|---|
| 550 | 80 |
| 730 | 40 |
| 900 | 35 |

While the degree of agitation is hard to define, it can be seen, however, that the highest agitation speed did not show a proportionate advantage. Under acid conditions agitator speed is more critical than under basic conditions in the reduction of nickel. As noted above, excessive agitation tends to form agglomerates of the fine-sized, low density powder product.

Temperature and pressure conditions are not readily subject to independent discussion. Further, they are both dependent on solution composition. By way of illustration, an ammoniacal nickel sulfate solution containing about 1.2 mols of Ni per liter and 5M free $NH_3$ per mol of Ni was reduced with hydrogen using about 100 g./l. of seed nickel powder. Holding other conditions approximately constant, it was found that at about 330°–335° F., raising the total pressure by increasing the hydrogen partial pressure increased the yield obtained in about 20 minutes from about zero at 500 p. s. i., where the $H_2$ partial pressure was negligible, through about 15–20% at about 600 p. s. i. to about 80–85% at 700 p. s. i., but only to about 90% at about 900 p. s. i. Economic considerations indicate that using higher total pressure would increase the costs too rapidly to be warranted. However, when a solution containing only 2M $NH_3$/M Ni was reduced at about 200 p. s. i. $H_2$ partial pressure and at about 300° F., the reduction proceeded at a slow rate. At about 350° F. the rate was approximately tripled, but at about 400° F. it was only about four times as fast. Thus, increasing temperature above 300° F. and holding the $NH_3$/Ni ratio to about two is more important for increasing the rate than increasing the $H_2$ partial pressure, but under adverse conditions, increased partial pressure is helpful. Tests were run on a nickel solution using the same procedure as in Table V, wherein a 200 p. s. i. $H_2$ partial pressure was established and the time noted for the $H_2$ to react. Data are given in Table XV below.

TABLE XV

| Solution M/l | | | Seed, (g./l.) | Temp. (° F.) | Time (Min.) | Residual Pressure | Remarks |
|---|---|---|---|---|---|---|---|
| $NiSO_4$ | $NH_3$ | $(NH_4)_2SO_4$ | | | | | |
| .72 | 1.4 | .36 | 0 | 375 | 230 | 65 p. s. i. g. | (Ni basic sulfate. |
| 1 | 2 | .5 | 0 | 425 | 96 | >1 atmosphere | 95% Ni. |
| 1 | 2 | 1.5 | 50 | 375 | 146 | 0 p. s. i. | 98.5% Ni. |
| 1 | 2 | 1.5 | 50 | 425 | 86 | 0 p. s. i. | 95% Ni. |

In the first test reduction did not proceed below 80 p. s. i. partial pressure. In the second test a more concentrated solution of the same composition was largely reduced to metal at a higher temperature. In the second and the other tests the nickel metal was not free of oxide. Seed had a helpful effect despite the increase in ammonium sulfate, and the reaction was faster at the higher temperature. Although reduction was obtained at a reasonable rate with less than 15 p. s. i. partial pressure, to help obtain oxide free metal a higher partial pressure, at least 50 p. s. i. and preferably 300–500 p. s. i., is desirable. Of course, if reduction is carried out from solutions containing free acid, no danger of oxide contamination of the metal exists, even with partial pressures of less than one atmosphere.

Reduction of ammoniacal sulfate and carbonate solutions are accomplished under similar optimum conditions except that the ammoniacal solutions exert greater vapor pressures. Therefore, temperatures appreciably higher than about 350° F. should be avoided. It is also desirable to limit the initial nickel concentration in carbonate to about 70 g./l. if it is not intended to operate at pressure above 900 p. s. i.

Preferably, also, even in treating a solution of optimum composition, seed powder should be slurried. Generally from about 5–100 g./l., depending on the size and activity of the seed powder, should be used. Seed should have a low density, preferably less than one.

While sulfate and carbonate solutions have been discussed as illustrative, other anions may be present. As the corresponding acids may have strengths differing from sulfuric, it is important to consider the terminal conditions, not in terms of percent free acid, but of free hydrogen ions which is usually expressed as pH. However, the free acid content may be so high that the pH value, a logarithmic function, does not emphasize the difference in conditions. In the present discussion and claims this factor has been defined, accordingly, in terms of hydrogen ion concentrations equivalent to those found in solutions of given free sulfuric acid contents.

By way of summary, for optimum nickel reduction certain initial conditions are desirable. However, for reduction to less than one gm./l. the terminal conditions are critical. Initial conditions may and often will be adjusted to produce the desired terminal conditions as well as to permit initiating reduction. Alternatively, further adjustments may be made during the course of reduction.

The foregoing limitations as discussed herein may be summarized for the illustrative cases as done below in Table XVI. The optimum columns represent conditions to produce residual nickel concentrations of 1gm./l. or less.

TABLE XVI

|  | Adjusted Ammoniacal Solutions | | | | Adjusted Acidic Solutions | |
|---|---|---|---|---|---|---|
|  | Carbonate | | Sulfate | | Sulfate | |
|  | Range | Optimum | Range | Optimum | Range | Optimum |
| Initial Ni Content (g./l.) | 10-100 | 65-70 | 10-135 | 80 | 10-100 | 70 |
| Initial NH₃/Ni Mol Ratio | 1.5-8 | 1.8-2.2 | 1.5-8 | 1.8-2.2 | | |
| Initial Ammonium Salt Content (M/l.) | 0-3 | 0.5-1 | 0-3 | 0.5-1 | 0-3 | 0.5-1 |
| Final Content Free H₂SO₄ (Percent-W./v.) | | | 0-5 | 0-0.5 | 0-5 | 0-0.5 |
| Initial Temp. (° F.) | 250-500 | 350 | above 300 | 400 | above 300 | 350-450 |
| Minimum Partial Pressure Reducing Gas (p. s. i.-H₂) | 50 | | 50 | | 10 | |

Two ammoniacal leach liquors from a copper nickel cobalt ore were treated to remove most of the copper and neutralized to pH 5.5 with sulfuric acid to precipitate the nickel as nickel ammonium sulfate crystals. Crystals from the first liquor, which contained more copper and cobalt, were thoroughly washed to remove thionates. Samples were dissolved with 3 moles NH₃ per mol nickel at 80 g./l. Ni and reduced at 435° F. with 400 p. s. i. H₂ pressure for 30 minutes. The first sample was reduced in the presence of commercial Ni powder seed, and successive samples used the powder product from the preceding test as seed. Each metal product was sampled and the sample washed with alcohol, then ether, dried on a steambath and analyzed.

The crystals from the second liquor were given only a slight wash, and hence thionates were still present. When dissolved and reduced as described above the nickel metal product contained sulfur. However, after heating to 750° F. in a hydrogen atmosphere the sulfur was removed.

Powder analyses from these tests are given in Table XVI.

TABLE XVII

| Product | Percent Seed | Percent Ni | Percent Cu+Co | Percent Fe | Percent S |
|---|---|---|---|---|---|
| Seed | 100 | 99.59 | .62 | .33 | .022 |
| 1st test—1st solution | 55 | 98.84 | .85 | .009 | <0.01 |
| 2d test—1st solution | 40 | 98.84 | .72 | .008 | <0.01 |
| 3d test—1st solution | 32 | 99.38 | .71 | .008 | <0.01 |
| 2d solution | ¹0 | 99.68 | .17 | .005 | .14 |
| 2d solution—H₂ dried | | 99.81 | .17 | .008 | <0.01 |

¹ Seed powder from previous runs under duplicate conditions.

Spectrographic examination showed no other impurities present above 0.001-0.01%. Apart from other gas reducible metals, the nickel product contains less than 0.1% total impurities. Even the iron in the seed is largely removed.

COBALT REDUCTION

Co is normally produced from sulfide, sulfide-arsenide or oxidized ores. These can be leached by various methods to dissolve cobalt. Ammoniacal carbonate or sulfate solution or acid sulfate solutions can be obtained. In ammoniacal solutions, any other anion may be present except those such as cyanide which form a substantially non-reducible complex, or those such as permanganate which react with the reducing gas. Some, such as the sulfates, are preferable to others, such as the carbonates, because of their higher solubility. Further, as will be discussed below, the terminal acidity below which cobalt salts can be reduced to metal is slight. An ammoniacal cobalt sulfate system will be the most commonly encountered in commercial practice and, accordingly, will be taken as illustrative for the purposes of this discussion.

Cobaltous sulfate is soluble in both acid and ammoniacal solutions of proper composition up to about 120 g./l. Co at ambient conditions. At neutral and slightly acidic conditions, when ammonium sulfate is present in sufficient amounts the double salt may be precipitated. This is another reason for preferring basic conditions. In ammoniacal solutions containing free NH₃, the basic sulfate will precipitate at NH₃/Co mol ratios below three unless sufficient ammonium sulfate is present. While it is possible, for economic reasons, it will seldom be desirable to treat liquors which contain less than 4 g./l. Co.

*Cobaltic reduction*

Cobalt is more easily oxidized to the trivalent state than is nickel. Further, cobaltic "ammine" sulfate $(Co(NH_3)_6)_2(SO_4)_3 \cdot 2H_2O$ is precipitated on strong oxidation of strongly ammoniacal solutions. This procedure may sometimes be used either to separate cobalt from other gas reducible metals or from dilute solutions. However, if it is slurried in water or dilute ammonia solutions and reduced with hydrogen at 300°-450° F., cobalt and ammonium sulfate are obtained. Little or no reduction of such cobaltic ammines is obtained below about 300° F., some reduction is obtainable at about 320°-325° F. and becomes capable of completion in about one-half hour at above about 370°-375° F. if conditions are otherwise correct. Seeding with powdered cobalt is in this case highly desirable. If the "free" ammonia exceeds about 3 M/l., sufficient hydrogen is necessary to produce a total pressure of above about 725 p. s. i. at 400° F. Because of the high ammonia partial pressure, which increases as reduction proceeds, the hydrogen partial pressure may be decreased to less than 50 p. s. i. A minimum total pressure of 800 p. s. i. is better. The usual temperatures encountered will extend from about 320° F. to about 500° F., preferably with the use of 200-500 p. s. i. H₂ partial pressure and total pressures of about 725-900 p. s. i. The strength of apparatus required to retain more than about 1000 p. s. i. is seldom warranted by any increase in reaction rate from using such pressures. The free ammonia content should be kept above that in the "ammine" salt but below about 3 M/l. The ammonium sulfate minimum will be that derived from reduction of the ammine salt, the maximum should be kept below about 4 and preferably below 0.8-1.0 M/l.

*Cobaltous reduction*

Cobaltous solutions high in ammonia and ammonium sulfate with composition similar to the cobaltic ammine slurries can also be reduced. Illustrative results from reductions of such solutions at about 450° F. using a hydrogen partial pressure of 400 p. s. i. and no seed are shown in Table XVIII.

TABLE XVIII.—EFFECT OF HIGH $NH_3$ AND $(NH_4)_2SO_4$

| Initial Content (M/l.) | | | Time (Min.) | Yield, Percent |
|---|---|---|---|---|
| Co | $NH_3$ | $(NH_4)^+$ | | |
| 0.88 | 10.3 | 1.6 | 60 | 65 |
| 0.87 | 9.4 | 1.75 | 60 | 81 |
| 0.85 | 8.2 | 1.7 | 60 | 83 |
| 0.75 | 6.4 | 5.4 | 120 | 44 |
| 0.79 | 5.2 | 5.0 | 120 | 69 |
| 0.82 | 6.65 | 3.5 | 120 | 80 |
| 0.88 | 6.75 | 1.7 | 120 | 88 |

From these and similar tests it has been found that increasing the ammonium sulfate content above 0.85 molar (1.7 mols $NH_4^+$) is found to impair the yield, as does increasing the free ammonia to above seven molar.

Seeding with cobalt metal powder will permit obtaining more rapid rates and/or the use of lower temperatures and pressures. Reduction of solutions containing lower amounts of ammonia and ammonium sulfate proceeds rapidly at 400° F. and 800 p. s. i. total pressure when seed is added. Typical results obtained under such conditions are illustrated below in Table XIX.

TABLE XIX.—SEEDING IN REDUCTION OF INTERMEDIATE SOLUTIONS

| Initial Content (M/l.) | | | Seed (g./l.) | Time (Min.) | Yield (Percent) |
|---|---|---|---|---|---|
| Co | $NH_3$ | $NH_4^+$ | | | |
| .12 | .48 | .48 | 665 | 30 | 100 |
| .12 | .48 | .48 | 200 | 20 | 100 |
| .6 | 2.4 | 1.44 | 665 | 30 | 99 |
| .69 | 2.8 | 2.8 | 200 | 20 | 86 |
| .95 | 3.8 | 3.8 | 665 | 30 | 89 |
| 1.2 | 9.5 | 2.4 | 100 | 20 | 82 |
| 1.2 | 9.2 | 4.6 | 100 | 20 | 32 |

It will be seen that in the first five tests $NH_3$/Co and $NH_4^+$/Co mol ratios of about four were used with excellent results, but that increases in either or both the ammonia or ammonium sulfate content decreased the yield.

Solutions containing even lower $NH_3$/Co ratios can also be rapidly reduced. Typical results obtained with hydrogen in about an hour at 425° F. and 850 p. s. i. total are shown below in Table XX.

TABLE XX

| Initial Content (M/l.) | | | Added $NH_3$ (M./l.) | Final Solution | | Percent Reduction |
|---|---|---|---|---|---|---|
| Co | $(NH_4)$ | pH [1] | | pH | Free $NH_3$ (M./l.) | |
| 0.91 | 0.25 | 3.0 | 4.4 | 9.6 | 1.5 | 99.9 |
| 0.85 | 0.64 | 3.7 | 3.4 | 9.05 | 0.75 | 100.0 |
| 0.95 | 1.19 | 3.0 | 2.4 | 10.9 | 0.5 | 99.5 |
| 0.48 | 0.77 | 6.0 | 1.2 | 8.4 | 0.1 | 97.5 |
| 0.43 | 1.3 | 2.1 | 1.1 | 8.3 | 0.04 | 93.5 |
| 0.14 | 1.3 | 2.4 | 0.35 | 8.0 | ------ | 99.5 |
| 0.88 | 0.73 | 3.0 | 1.76 | 2.5 | ------ | 80.0 |

[1] Solutions used in these tests were obtained by acid leaching and the leach liquors treated with lime to precipitate impurities. The pH after liming but before $NH_3$ addition is shown.

The last test shows that when the added ammonia is less than an $NH_3$/Co mol ratio of about two, the solution soon becomes too acid and reduction will stop at a pH of about 2.5 with up to about 10 g./l. of cobalt still in solution.

The cobalt content of a neutral solution, i. e., containing no free ammonia, can be reduced to some extent, if enough hydrogen pressure is applied. However, a substantial reduction can be obtained if ammonia gas is added to the autoclave during reduction. When the ammonia content is deficient and some free acid is present, reduction will be incomplete. However, it can be made complete by maintaining a pH slightly above 7. When only small amounts of ammonia are added before reduction, for example 1 mol $NH_3$ per mol cobalt, reduction stops when the solution becomes acid but the product contains basic cobalt sulfate. Reduction under these conditions of cobalt solution containing about 0.5 M/l. of cobalt and 1.0 M/l. of $(NH_4)^+$ at about 450° F. is illustrated by the four typical results shown in Table XXI. In the first run no $NH_3$ was added; in the second, one mol/mol cobalt was initially added; in the third and fourth runs $NH_3$ was added periodically during the run to restore basic conditions; in the fourth solution being maintained basic until the end.

TABLE XXI.—ACID REDUCTION OF COBALT SULFATE SOLUTIONS

| Initial Solution (M/l.) | | Final Solution | | Time, Min. | Temp., (° F.) | Total Pressure | Percent Yield |
|---|---|---|---|---|---|---|---|
| Co | $(NH_4)^+$ | pH | Free $H_2SO_4$ (M./l.) | | | | |
| 0.5 | 1.0 | -- | 0.09 | 60 | 450 | 1,370 | 16 |
| 0.5 | 1.0 | -- | .04 | 60 | 450 | 900 | [1] 55 |
| 0.5 | 1.0 | -- | .012 | 90 | 450 | 1,000 | 76 |
| 0.5 | 1.0 | 7.4 | ------ | 100 | 450 | 1,000 | 93 |

[1] 55% yield of metal was obtained. Some basic sulfate also was precipitated.

By way of summary, cobalt containing solutions ranging from slightly acid to highly ammoniacal and containing widely varying proportions of ammonia, ammonium sulfate and cobalt can be successfully reduced. Definite limits exist, however, which must be obeyed to make the process operable, and even narrower conditions must be observed for optimum results.

Table XXII gives a powder analysis of a cobalt product obtained by the treatment of a sulfate solution from which nickel previously had not been completely removed. The solution contained ammonia in a mol ratio to Co of 3 and ammonium sulfate in a mol ratio to Co of 0.81. Reduction with hydrogen was conducted at 350° F. at a total pressure of 600 p. s. i. for 90 minutes. 80 gms./l. seed powder of —325 mesh was employed.

TABLE XXII.—COBALT POWDER FROM SULFATE SOLUTION

[Analysis percent or g./l.]

| | Co | Ni | Fe | Cu | As | S |
|---|---|---|---|---|---|---|
| Initial Solution | 49.0 | 3.38 | 0.05 | 0.0 | 0.0 | -------- |
| Tail Liquor | 0.16 | 0.03 | ----- | ----- | ----- | -------- |
| Co Powder...........percent | 94.9 | 4.7 | 0.10 | 0.00 | <0.01 | 0.039 |

The reaction is facilitated by operating with at least one, preferably at least two, but not more than about seven mols of ammonia per mol of cobalt. The best results are obtained at $NH_3$/Co ratios ranging from about two to about four. Preferably, there should be at least 0.5 or more mols of ammonium sulfate per liter. The upper limits range from $(NH_4)^+$/Co ratios of about 0.8–1.0 for high $NH_3$/Co ratios above about 4 to about 3–4 for $NH_3$/Co ratios of 2–4. In the presence of ammonium sulfate, some reduction can take place in solutions containing as much as 0.9% free sulfuric acid but for complete recovery, i. e., reduction to less than 1 g./l. ammoniacal solutions more basic than pH 7.0 are needed.

ADDITIONAL REDUCTIONS

Other metals which form complexes

In addition to the copper, nickel and cobalt discussed above, several other metals, for example, silver, mercury, cadmium, zinc, and manganese also form similar ammine complexes. Of these illustrative cases, the first two are more easily reducible with hydrogen than copper; the latter three more difficultly than cobalt.

Ag and Hg are even more easily reducible than copper, so that, like copper, they may be directly reduced with hydrogen in the presence of much free acid. This may be illustrated by the following Table XXIII illustrating results obtained at the indicated conditions.

TABLE XXIII

| Metal | M./l. | Anion | Temp. (° F.) | Total Pressure (p. s. i.) | Time (Mins.) | Yield (Percent) |
|---|---|---|---|---|---|---|
| Ag | 0.1 | $SO_4$ | 400 | 1,000 | 60 | 80+ |
| Hg | 0.5 | $NO_3$ | 400 | 700 | 60 | 60+ |

These and similar results are interesting for several reasons. The yields are good enough so that complete recovery can be obtained in a closed circuit. While the yields can be improved by complexing it is not commercially necessary. Anions such as the nitrate, which for salts of baser metals would react with the reducing gas, can be used. Direct reduction from acid avoids the necessity of handling silver and mercury compounds which are dangerous when dry. Silver and mercury then represent about the limiting metals so far as the lower (electronegative) position in the oxidation-reduction potential tables is concerned.

Cobalt, on the other hand, is reducible from solutions containing but a low free acid content, even when amine complexed. Of the more active metals which form ammine complex ions the sulfates and/or carbonates of which are soluble in ammine solutions with a suitable electrolyte, some can be gas reduced usefully, others cannot. This is capable of illustration by the reductions of ammoniacal sulfate solutions attempted with hydrogen at about 435° F., for 60 minutes at 1200 p. s. i. total pressure shown in the following Table XXIV.

TABLE XXIV

| Solution Content | | | Electrolyte | M./l. | Red. Obtained |
|---|---|---|---|---|---|
| Metal | M./l. | Amine | | | |
| Cd | 1.0 | $NH_3$ | $(NH_4)_2SO_4$ | 0.5 | Yes. |
| Cd | 1.0 | $C_2H_4(NH_2)_2$ | $H_2SO_4$ | 0.9 | Yes. |
| Zn | 1.0 | $NH_3$ | $(NH_4)_2SO_4$ | 0.5 | No. |
| Zn | 0.5 | $CH_3NH_2$ | | 2.0 | No. |
| Zn [1] | 1.0 | $C_2H_4(NH_2)_2$ | $H_2SO_4$ | 5.0 1.4 | No. |
| Zn [1] | [2] 1.0 | $C_5H_5N$ | $H_2SO_4$ | 3.0 1.8 | No. |

[1] 2,000 p. s. i. total pressure.
[2] 120 minutes.

Cadmium was reduced to metal while zinc was not, despite more vigorous treatment.

Use of additional amines

Much of the previous discussion has been concerned with $NH_3$ as the amine. It was noted that other amines may be used if so desired. Cobalt, nickel and copper all reduce completely (to less than about 1 g./l. in solution) from complexes with such organic amines as methyl and ethyl amine, ethylene diamine, pyridine and the like. In sulfate solutions the electrolyte may be free acid in some cases. In both sulfate and carbonate solutions it may be an ammonium salt or a salt of the amine used.

In copending application for United States Letters Patent, Serial No. 276,711, filed of even date, U. S. P. 2,694,005 it has been shown that in selective, sequential reduction of metals from amine solutions of salts of more than one metal, certain of these amines permit a more selective separation to be obtained than ammonia. However, their use, as shown by Table XXIV, does not accomplish the reduction of zinc. The useful range therefore appears to be those non-ferrous metals which form complexes with ammonia and which have oxidation potentials including and between those of about silver or mercury and cadmium.

Solutions other than water

In all the foregoing examples, water solutions have been used. It is not necessary to use water, however. In fact other solvents have certain advantages. For instance, hydrogen is more soluble in alcohols than in water. Further acids produced by reduction are considerably less ionized in non-aqueous solutions and hence do not impair the reduction. Cadmium, which was the metal most difficult to reduce from water solutions, is easily reduced from an alcohol solution of its acetate as shown in Table XXV.

TABLE XXV

| Solvent | Salt | Time (Hrs.) | Temp. (° F.) | $H_2$ partial Pressure, p. s. i. | Yield (Percent) | Purity |
|---|---|---|---|---|---|---|
| Methanol | 0.5 M Cd $(CH_3COO)_2$ | 1 | 392 | 500 | 65 | 99+% Cd. |
| Isopropanol | 0.5 M Cd $(CH_3COO)_2$ | 1 | 392 | 500 | 80 | 99+% Cd. |

Anions other than sulfate and carbonate

Anions other than $SO_4$ and $CO_3$ can be employed in whole or in part in solutions from which Cu, Ni and Co are reduced, providing they permit adequate solubility, are stable in solution at reduction temperatures, do not react with the reducing gas, or do not form non-reducible complexes.

In ammonia solutions, there are few anions which do not give adequate solubility of the illustrative metals in the ammonia complex form. In acid solutions, the choice is more limited, e. g., phosphate causes precipitation in acid solutions. Further, a complex-forming anion is highly desirable if no ammonia is present, e. g., chloride works but poorly for copper and is not useful for nickel. However, the complex should not be too strong, e. g., cyanide will permit considerable copper reduction but cannot be used with nickel. Other anions such as nitrate not only do not appear to form complexes with these metals but may react with the reducing gas in acid solutions, although stable in basic solutions. Other anions such as fluosilicate are suitable in acid solutions but in ammoniacal solutions are decomposed at reaction temperature (to $NH_4F$ and $SiO_2$ gel). Examples thereof for reduction of 0.5–1 M metal solutions at 400–440° F.

for 60 minutes at 900 p. s. i. with $H_2$ are given in Table XXVI.

TABLE XXVI

| Metal | Solution Content | | | | M/l. | Yield |
|---|---|---|---|---|---|---|
| | Anion | Amine or Acidity | M/l. | Electrolyte | | |
| Cu | Cl | pH 2 | -------- | $NH_4Cl$ | 0.5 | poor.[1] |
| Cu | Cl | pH 2 | -------- | NaCl | 1.0 | good.[1] |
| Cu | $PO_4$ | $NH_3$ | 4 | $(NH_4)_3PO_4$ | 0.2 | poor. |
| Cu | $SiF_6$ | $NH_3$ | 4 | $(NH_4)_2SiF_6$ | 0.3 | high.[1] |
| Cu | $SO_4$ | -------- | -------- | KCN | 4.0 | good. |
| Ni | Cl | $NH_3$ | 4 | $NH_4Cl$ | 0.5 | high. |
| Ni | $CH_3CO_2$ | $CH_3CO_2H$ | 1 | $NH_4Ac$ | 0.2 | comp. |
| Ni | $PO_4$ | $NH_3$ | 4 | $(NH_4)_3PO_4$ | 0.2 | good.[1] |
| Ni | $SiF_6$ | $NH_3$ | 4 | $(NH_4)_2SiF_6$ | 0.3 | comp.[1] |
| Ni | $SiF_6$ | pH 2 | -------- | $(NH_4)_2SiF_6$ | 0.3 | high. |

[1] Some non-metallic precipitate.

In the test with nickel acetate the final solution contained 3 M free acid, and in the nickel fluosilicate test the final acidity was 1 M. However, these acids are weaker than sulfuric and the actual hydrogen ion concentration was no greater than that of a sulfate solution containing 1% free acid.

In the previous discussion of the present invention, the sources of the solutions discussed and illustrated were considered irrelevant so long as they comprised essentially but one reducible metal. When obtained by leaching of ores or ore concentrates and the like sources, such solutions will not be so chemically pure as to contain only compounds of the particular metal. Quite surprisingly, results obtained by the present process on such "impure" solutions are generally quite satisfactory.

I claim:

1. A method of producing substantially oxide-free non-ferrous elemental metal powder, said metal having an oxidation-reduction potential between that of cadmium and that of silver inclusive and being capable of forming with ammonia in aqueous solution a complex cation the salts of which are more soluble than those of the metal, which comprises: adjusting a solution of a dissolved salt of one such metal to contain (a) a total concentration of said metal up to about 200 g./l. but less than that at which, in the absence of a partial pressure of reducing gas, a substantial amount of a compound of said metal will precipitate while heating to above about 250° F., (b) at least a part of said dissolved metal in a form of a soluble gas-reducible ion, (c) a hydrogen ion concentration up to about that equivalent to a 20% free sulfuric acid solution but less than that at which precipitation of said dissolved metal in a form other than elemental metal powder occurs under reduction conditions, and (d) a finite amount of a compatible electrolyte; subjecting adjusted solution to an over-pressure of a non-sulfidizing reducing gas of at least about 50 p. s. i. g. while maintaining a total pressure sufficient to prevent boiling, providing a material capable of reacting with acidic anions whereby the hydrogen ion concentration is controlled so as to precipitate elemental metal only, and collecting precipitated metal powder.

2. A method of producing substantially oxide-free non-ferrous elemental metal powder, said metal having an oxidation-reduction potential between cadmium and silver inclusive and being capable of forming with ammonia in aqueous solution a complex cation the salts of which are more soluble than those of the metal, which comprises: adjusting a sulfate solution of one such metal to contain (a) up to about 135 g./l. of dissolved metal, (b) a maximum hydrogen ion concentration ranging from that equivalent to about a 20% free sulfuric acid solution for silver through those of about 15% for copper and mercury, 5% for nickel and 0.5% for Co to about $10^{-8}$ mols $H^+$ per liter for cadmium and (c) a finite amount of said dissolved metal as a soluble, gas-reducible complex ion of the metal; at about 250° F., treating the adjusted solution with a non-sulfidizing reducing gas at a partial pressure of at least 50 p. s. i. g. while maintaining a total pressure sufficient to prevent boiling; maintaining the hydrogen ion concentration below said initial maximum concentration until reduction to elemental metal only ceases; and collecting precipitated metal.

3. A method of producing substantially oxide-free non-ferrous elemental metal powder, said metal having an oxidation-reduction potential between cadmium and silver inclusive and being capable of forming with ammonia in aqueous solution a complex cation of the salts of which are more soluble than those of the metal, which comprises: adjusting a carbonate solution of one such metal to contain (a) up to about 200 g./l. of dissolved metal, (b) hydrogen ion concentration at which the $CO_2$ partial pressure at reduction temperature will be less than that of the reducing gas, and (c) a finite amount of said dissolved metal in a soluble, gas-reducible complex ion of the metal; treating the adjusted slution with a non-sulfidizing reducing gas at a temperature above about 250° F., a minimum partial pressure of reducing gas of about 50 p. s. i. g., and a total pressure sufficient to prevent boiling; maintaining the hydrogen ion concentration below that at which reduction to elemental metal only will cease; and collecting precipitated metal.

4. A method of producing substantially oxide-free non-ferrous elemental metal powder, said metal having an oxidation-reduction potential between cadmium and silver inclusive and being capable of forming with ammonia in aqueous solution a complex cation the salts of which are more soluble than those of the metal, which comprises: adjusting a carbonate solution of one such metal to contain (a) up to about 200 g./l. of dissolved metal, (b) from about 2–8 mols/l. of total ammonia and a $CO_2$/metal mol ratio ranging accordingly from about 0.5 to about 2.5, and (c) a finite amount of said dissolved metal as a soluble, gas-reducible complex ion of the metal; treating the adjusted solution with a non-sulfidizing reducing gas at a temperature above about 250° F., a minimum partial pressure of reducing gas of about 50 p. s. i. g., and a total pressure sufficient to prevent boiling; maintaining the hydrogen ion concentration of the solution below that at which reduction to elemental metal only will cease; and collecting precipitated metal.

5. In treating clarified ammoniacal solutions of copper carbonates to produce substantially oxide-free copper powder in good yield, the method comprising: adjusting the clarified solution to contain (a) as complex ammine carbonate, dissolved copper up to 200 g./l., (b) a total $NH_3$/Cu mol ratio of from about 2–6, and (c) a maximum $CO_2$/Cu mol ratio ranging from about 0.8 for solutions containing 2 mols of total ammonia per mol of copper to about 1.5 for solutions containing about 6 mols of total ammonia per mol of copper; treating the adjusted solution with a non-sulfidizing reducing gas at a temperature above about 250° F., a minimum partial pressure of reducing gas of about 50 p. s. i. g., and a total pressure sufficient to prevent boiling, whereby copper metal powder is precipitated with the concurrent formation of ammonium carbonate, which at reduction temperature exerts appreciable $NH_3$ and $CO_2$ partial pressures; maintaining the ammonium carbonate content of the liquid phase below 3 molar, and collecting precipitated copper.

6. In treating clarified ammoniacal copper sulfate solutions to produce substantially oxide-free copper powder in good yield, the method comprising: adjusting the clarified solution to contain (a) as a complex ammoniacal sulfate, dissolved copper up to 100 g./l., (b) ammonia in a finite amount up to a total $NH_3/Cu$ mol ratio of about 8, and (c) a finite amount of a compatible sulfate in molar amount less than 3.6 minus the mols of copper initially present; at a temperature above about 250° F., treating the adjusted solution with a non-sulfidizing reducing gas while maintaining a finite pressure of reducing gas and a total pressure sufficient to prevent boiling; maintaining the hydrogen ion concentration below that at which reduction to elemental copper only will cease, and collecting precipitated copper.

7. In treating clarified copper sulfate solutions to produce substantially oxide-free metal powder in good yield, the method comprising: adjusting the clarified solution to contain (a) a concentration of dissolved copper up to 100 g./l., (b) a free sulfuric acid content, below about 17%, and (c) a finite amount of said dissolved copper as a soluble, gas-reducible complex ion of the metal; at a temperature above about 250° F., treating the adjusted solution with a non-sulfidizing reducing gas while maintaining a finite pressure of reducing gas and a total pressure sufficient to prevent boiling; maintaining the free sulfuric acid content below about 17%, and collecting precipitated metal.

8. In treating clarified solutions of nickel salts to produce substantially oxide-free nickel powder in good yield, the method comprising: adjusting the clarified solution to contain (a) a total concentration of dissolved nickel up to about 135 g./l. but below that at which in the absence of reducing gas a substantial amount of a nickel compound will precipitate while heating to above about 250° F., (b) a hydrogen ion concentration at which elemental metal reduction will occur under reduction conditions, and (c) a finite amount of said nickel as a soluble, gas-reducible complex nickel ion; treating the adjusted solution with a non-sulfidizing reducing gas while maintaining a finite pressure of reducing gas and a total pressure sufficient to prevent boiling; maintaining the hydrogen ion concentration below that at which reduction to elemental nickel only will cease, and collecting precipitated nickel.

9. In treating a clarified ammoniacal solution containing an inorganic nickel salt by direct gas-reduction, to produce high-grade nickel powder in good yield, the method comprising: adjusting the solution to produce therein a dissolved nickel content up to about 135 g./l., a pH of at least 6.8 and an ammonia content sufficient to convert the nickel to an ion of the type $Ni(NH_3)_x^{++}$ wherein $x$ has an apparent value of 1.5–4; treating solution thus obtained at elevated temperatures and pressures with a non-sulfidizing reducing gas, and collecting resultant precipitated nickel.

10. In treating clarified ammoniacal nickel sulfate solutions to produce substantially oxide-free nickel powder in good yield, the method comprising: adjusting the clarified solution to contain (a) as a complex ammoniacal sulfate, dissolved nickel up to 100 g./l., (b) ammonia in a finite amount up to a total of $NH_3/Ni$ mol ratio of about 4, and (c) a finite amount of a compatible sulfate in molar amount less than 4.6 minus the mols of nickel initially present; at a temperature above about 250° F., treating the adjusted solution with a non-sulfidizing reducing gas while maintaining a finite pressure of reducing gas and a total pressure sufficient to prevent boiling; maintaining the hydrogen ion concentration below that at which reduction to elemental nickel only will cease, and collecting precipitated nickel.

11. In treating clarified nickel sulfate solutions to produce substantially oxide-free metal powder in good yield, the method comprising: adjusting the clarified solution to contain (a) a concentration of dissolved nickel up to 100 g./l., (b) a free sulfuric acid content, below about 5%, and (c) a finite amount of said dissolved nickel as a soluble, gas-reducible complex ion of the metal; at a temperature above about 250° F., treating the adjusted solution with a non-sulfidizing reducing gas while maintaining a finite pressure of reducing gas and a total pressure sufficient to prevent boiling; maintaining the free sulfuric acid content below about 5%, and collecting precipitated metal.

12. In treating a clarified ammoniacal solution containing an inorganic cobalt salt to produce high grade cobalt powder in good yield, the method comprising: adjusting the solution to produce therein a dissolved cobalt content up to 120 g./l., a pH of at least 6.8 and an ammonia content sufficient to convert the cobalt to an ion of the type $Co(NH_3)_x^{++}$ wherein $x$ has an apparent value of 1–7; treating solution thus obtained at elevated temperatures and pressures with a non-sulfidizing reducing gas, and collecting resultant precipitated cobalt.

13. In treating clarified ammoniacal cobalt sulfate solutions to produce substantially oxide-free cobalt powder in good yield, the method comprising: adjusting the clarified solution to contain (a) as a complex ammoniacal sulfate, dissolved cobalt up to 120 g./l., (b) ammonia in a finite amount up to a total $NH_3/Co$ mol ratio of about 7, and (c) a finite amount of a compatible sulfate in molar amount less than 5.6 minus the mols of cobalt initially present; treating the adjusted solution with a non-sulfidizing reducing gas at a temperature above about 300° F., a minimum partial pressure of reducing gas of about 50 p. s. i. g., and a total pressure sufficient to prevent boiling; maintaining the hydrogen ion concentration below that at which reduction to elemental cobalt only will cease, and collecting precipitated cobalt.

14. In treating clarified cobalt sulfate solutions to produce substantially oxide-free metal powder in good yield, the method comprising: adjusting the clarified solution to contain (a) a concentration of dissolved cobalt up to 120 g./l., (b) a free sulfuric acid content, below about 0.5% and (c) a finite amount of said dissolved cobalt as a soluble, gas-reducible complex ion of the metal; treating the adjusted solution with a non-sulfidizing reducing gas at a temperature above about 300° F., a reducing gas minimum partial pressure of about 50 p. s. i. g., and a total pressure sufficient to prevent boiling; maintaining the free sulfuric acid content below about 0.5%, and collecting precipitated metal.

References Cited in the file of this patent

UNITED STATES PATENTS

| | | |
|---|---|---|
| 637,140 | Martino et al. | Nov. 14, 1899 |
| 1,397,684 | Hahn | Nov. 22, 1921 |
| 1,432,775 | Mitscherling | Oct. 24, 1922 |
| 1,503,229 | Clark | July 29, 1924 |
| 1,686,391 | Muller et al. | Oct. 2, 1928 |
| 1,783,662 | Marx et al. | Dec. 2, 1930 |
| 1,816,742 | Queneau | July 28, 1931 |

FOREIGN PATENTS

| | | |
|---|---|---|
| 68,213 | Switzerland | Dec. 23, 1913 |